United States Patent [19]

Garver

[11] 3,739,301

[45] June 12, 1973

[54] SINGLE DOIDE SINGLE SIDEBAND MODULATOR

[75] Inventor: Robert V. Garver, Boyds, Md.

[73] Assignee: The United States of America as represented by the Secretary of the Army, Washington, D.C.

[22] Filed: June 30, 1971

[21] Appl. No.: 158,477

[52] U.S. Cl. .............. 332/16 R, 307/271, 307/317, 332/45, 332/52, 333/1.1

[51] Int. Cl. .............................................. H03c 3/22

[58] Field of Search ..................... 332/16, 16 T, 45, 332/302, 52; 307/320, 317, 271; 317/234 VA, 235 AD; 333/1.1; 325/137, 138

[56] References Cited

UNITED STATES PATENTS

| | | | |
|---|---|---|---|
| 3,573,660 | 4/1971 | Garver | 332/45 |
| 3,422,378 | 1/1969 | La Rosa | 333/1.1 UX |
| 2,899,646 | 8/1959 | Read | 317/234 VA |
| 3,487,338 | 12/1969 | Matzelle et al. | 332/16 T X |
| 3,245,002 | 4/1966 | Hall | 317/235 AD |
| 3,319,188 | 5/1967 | Brutsch | 332/30 V |
| 3,479,615 | 11/1969 | Garver | 332/16 |
| 3,560,883 | 2/1971 | Rogers | 332/16 T |

*Primary Examiner*—Alfred L. Brody
*Attorney*—Harry M. Saragovitz, Edward J. Kelly, Herbert Berl et al.

[57] ABSTRACT

A transmission line feeds a PIN diode with an information signal. A modulating signal biases the diode so as to switch the diode between forward and reverse bias at an r.f. frequency. The PIN diode exhibits variable capacitance during switching which results in the generation, on the transmission line, of a single sideband modulated signal.

8 Claims, 8 Drawing Figures

INVENTOR,
ROBERT V. GARVER
BY Harry M. Saragovitz
Edward J. Kelly
Herbert Berl
Saul Elbaum
ATTORNEYS

SINGLE DOIDE SINGLE SIDEBAND MODULATOR

The invention described herein may be manufactured, used and licensed by and for the United States Government for governmental purposes without the payment to us of any royalty theron.

FIELD OF THE INVENTION

The present invention relates to a single sideband modulators and more particularly to such a modulator employing a PIN diode as the modulating element.

THE PRIOR ART

Considering the state of the art, single sideband (SSB) modulators use at least two diodes and some interconnecting r.f. transmission lines to obtain the correct phase condition at each diode. A single sideband modulator of this type is capable of operating at low doppler frequencies and up to a few MHz. However, above 30 MHz the described conventional modulator is inappropriate. A more complete description of this prior art circuit appears hereinafter.

SUMMARY OF THE INVENTION

The present invention uses injection-recombination mechanisms inside the I region of a PIN diode to provide the necessary phase conditions for single sideband modulation. It has the advantage over conventional modulators using PIN diodes in that the present circuit operates at higher frequencies. Further, fewer components are required because only a single diode is used with fewer r.f. circuits cooperating therewith. In accordance with the present invention, by modulating a PIN diode with a sine wave at several MHz, the single diode will provide single sideband modulation to r.f. power incident to it.

The above-mentioned objects and advantages of the present invention will be more clearly understood when considered in conjunction with the accompanying drawings, in which.

DESCRIPTION OF THE INVENTION

Figure 1:
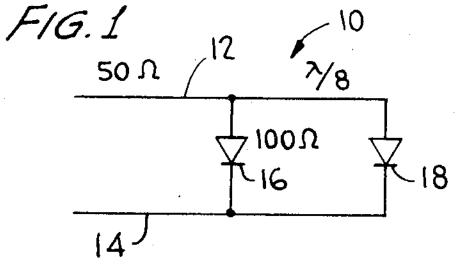
FIG. 1 is a schematic illustration of a prior art SSB modulator employing dual PIN diodes.

Referring to the drawings and more particularly FIG. 1, a prior art single sideband modulator is generally denoted by reference numeral 10. Conductors 12 and 14 comprise a transmission line which feeds two PIN diodes 16 and 18 connected in parallel across the transmission line. The anodes of these diodes are directly connected to conductor 12, while the cathodes of these diodes are directly connected to the other conductor 14. Typically, the diodes are separated by a distance of one-eighth wave length. By way of example, the diodes in existing state of the art circuits are driven in phase quadrature. Thus, if the input transmission line has a characteristic impedance of 50 ohms, the line between them must have a characteristic impedance of 100 ohms.

Figure 2:
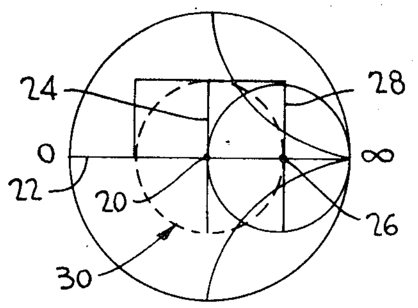
FIG. 2 is a Smith chart which graphically indicates the operation of the circuitry of FIG. 1.

With reference to the Smith chart shown in FIG. 2, when the diodes are biased to 100 ohms, the corresponding position on the Smith chart is point 20, in the center of the chart. It is to be noted that a characteristic of the PIN diode is that its resistance changes with bias. However, the reactance of the PIN diode does not change with bias. As the bias changes, the operating point on the Smith chart changes on the real axis 22.

When moving along the transmission line by a distance of one-eighth wave length, a line of operation is changed from the real axis 22 to a line 24 which has been rotated 90° from the real axis 22. If a second diode is placed in the same plane, a distance of one-eighth wave length closer to the generator, the circuit is returned to an operating line that is horizontal and centered at 26.

The two diodes connected across the transmission line as indicated in FIG. 1 gives us a new vertical line 28 on the Smith chart, after another 90° rotation of the operating line. Thus, by moving the two diodes apart from one another on the transmission line, a square shaped region is produced with its center at point 20. Accordingly, by driving the diodes in phase quadrature, a circle 30 can be described. By adjusting the input impedance, the circle can be positioned with its center at point 20. This describes, on the Smith chart, single sideband modulation attainable with two PIN diodes.

However, the primary problem involved with utilizing two PIN diodes is the operating frequency limitations. This is due to the fact that injection of carriers in the PIN material requires a determinable period of time. Although this period is relatively short, when two diodes must be considered, there is a cumulative effect of the time requirement for carrier injection. Thus, at high frequencies, this becomes a design limitation.

Figure 3:
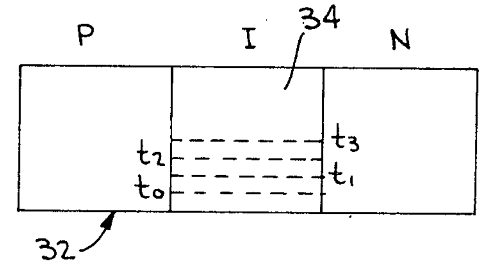
FIG. 3 is a pictoral representation of the carrier density in a PIN diode when operating in the circuit shown in FIG. 1.

Referring to FIG. 3, a PIN diode generally indicated by reference numeral 32 is schematically illustrated for the purpose of indicating the junctions of this solid state device. When a PIN diode is switched from reverse bias to forward bias, there is a low drift field applied to the I region 34 and carriers drift into the I region filling it up as schematically indicated in FIG. 3. The carrier density increases as a function of time when the bias condition is switched from reverse to forward. This density increase, as a function of time, is indicated by the progression of levels in the I region ($t_o$–$t_3$). As this occurs, the I region behaves as a resistor whose resistance decreases until a steady state forward bias condition is maintained.

Figure 4:
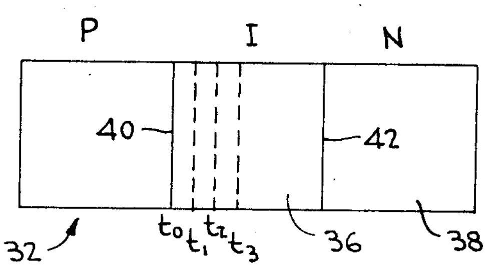
FIG. 4 is a pictoral representation of the carrier density in a PIN diode when operating in the circuitry of the present invention.

When a large reverse bias is applied to the forward biased PIN diode, a very high field is created immediately at each back biased junction. The carriers drift out of the I region 34 as a wall progressing horizontally across the I region 36 as shown in FIG. 4. Immediately after switching to a reverse bias condition, the expanding depletion region can be characterized as a capacitance going from infinity to some minimum value.

To consider this reverse bias condition in greater detail, holes and electrons are present in the I region. When a reverse bias is imposed on the diode, there are electrons in the N region 38 as well as the I region 36. However, at the I-P junction 40, the electron carriers are swept to the I region 36. In a similar manner, hole carriers exist throughout the diode. When reverse bias is applied to the diode, the holes begin becoming depleted at the I-N junction 42. These carriers will begin to move back to the P region.

Figure 5:
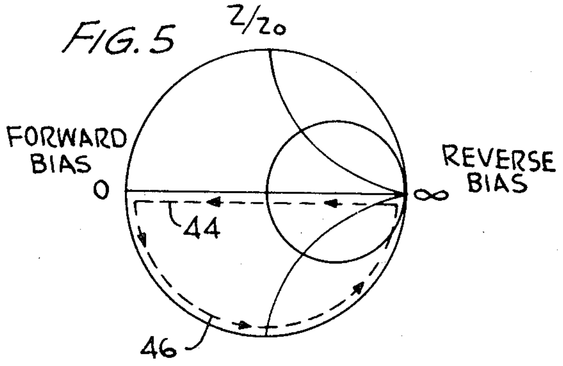
FIG. 5 is a Smith chart which graphically indicates a mode of operation of a PIN diode in a SSB modulator.

Considering the varying impedance characteristics of the PIN diode, reference is made to the Smith chart of FIG. 5. The r.f. impedance of the diode during switching is shown on this chart.

When the diode is forward biased there is an impedance of 0 ohms. When the diode is reverse biased, the impedance is infinite. As the switching goes from reverse bias to forward bias, the horizontal line 44, in FIG. 5, is followed. When the switching continues from forward bias to reverse bias, the diode acts as a capacitance and the impedance changes from an infinite capacitance to 0 capacitance and path 46 on the Smith chart of FIG. 5 is followed. If the switching is to be done at a rpaid rate, the semicircular area bounded by lines 44 and 46 is generated and these lines do not cross one another on the Smith chart. If crossing lines were existent on the Smith chart representation, sidebands of different amplitudes would be present.

Figure 6:
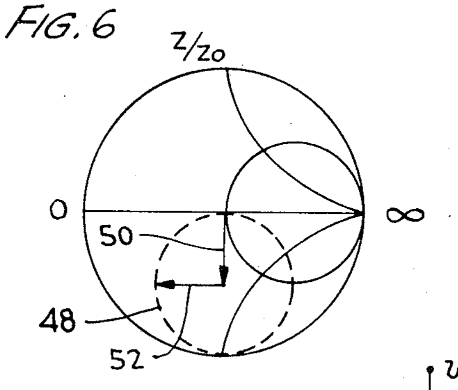
FIG. 6 is a Smith chart which graphically indicates another mode of operation of a PIN diode in a SSB modulator.

Considering FIG. 6, when a sine wave is applied to a PIN diode, instead of a square wave, the switching impedance figure takes on the shape shown in FIG. 6. The dotted circle 48 results from a degeneration of the semicircular pattern 46 shown in FIG. 5. This degeneration occurs as the frequency changes from a relatively low frequency square wave to a high frequency sine wave.

This graphical representation on the Smith chart indicates two vectors positioned as radii of the dotted circie 48. The vector 50 represents the voltage of reflected carrier power while the vector 52 represents the voltage of the reflected single sideband.

Figure 7:
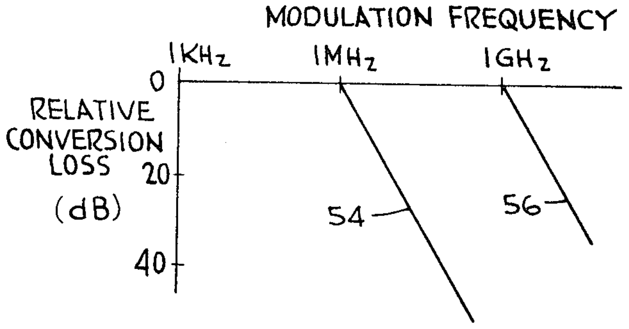
FIG. 7 is a plot showing roll off characteristics of a SSB modulator.

At low enough frequencies, the diode impedance would stay on the real axis, and both sidebands would be present in equal magnitude. Referring to FIG. 7, as frequency is increased, the lower sideband 54 would begin to roll off faster than the upper sideband 56. In the case of rapid switching, as discussed in connection with FIG. 5, a semicircular pattern is exhibited on the Smith chart, and also as previously mentioned, the sidebands are of unequal magnitude. The upper sideband 56 (FIG. 7) would be greater than the lower sideband 54 for the rapid switching condition discussed. Thus, the conversion loss to the lower sideband 54 begins to decrease as the frequency increases. In the case of extremely high switching frequencies, the conversion loss of upper sideband 56 would tend to decrease due to finite life time, and rectification related to PIN diodes. However, there is a significant range where the lower sideband 54 is down while the upper sideband 56 is not. In fact, there can be a relative conversion loss of 20–40 dB between the two under these circumstances. This condition defines a single sideband modulator.

It is of interest, that as modulation power drive is increased, the separation between the upper and lower sideband modulator, the modulation power must be carefully considered.

Another design consideration is that the upper and lower sidebands 54 and 56 can be shifted downwardly in frequency as the length of the I region is increased.

Figure 8:
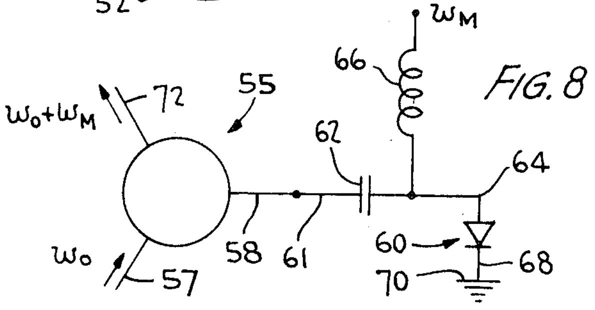
FIG. 8 is a schematic of circuitry forming the present invention.

In order to appreciate the physical apparatus of the present invention necessary to achieve total single sideband modulation with a single PIN diode, attention is directed to FIG. 8. This figure schematically illustrates a circulator 55 having a normal input arm 57 through which information is transmitted. Arm 58 of the circulator is electrically connected to the PIN diode 60 through a transmission line 61 having a blocking capacitor 62 connected therealong. The anode 64 of diode 60 is connected through an inductor 66 to a modulating signal. The cathode 68 of the PIN diode 60 is connected to ground 70. The modulating signal switches the biasing across the diode 60. As a result, in accordance with the invention, the output arm 72 of the circulator carries a normal single sideband modulated signal.

It should be understood that the invention is not limited to the exact details of construction shown and described herein for obvious modifications will occur to persons skilled in the art.

I claim:

1. A single sideband modulator comprising a single PIN diode means having at least two junctions, means for driving the single diode means through a blocking capacitor with a carrier signal, means for simultaneously biasing the single diode means through an inductor with a modulation signal, said modulation signal having a frequency of at least 30 megahertz for varying the resistance of the single PIN diode means during switching of the diode means bias to build up hole carriers, wherein said second-named means and said third-named means combine said carrier signal and said modulation signal to provide, within said single diode means, a lower sideband signal and an upper sideband signal and a relative conversion loss of 20-40 decibels therein between, means connected to the single diode means for extracting a single sideband modulation signal, and wherein said diode means consists entirely of a single PIN diode.

2. The circuitry set forth in claim 1 wherein the diode is characterized as a PIN diode.

3. The circuitry defined in claim 2 wherein the modulation signal switches the biasing of the diode in a manner causing the diode to exhibit a capacitive impedance characteristic imposing rapid roll-off of an undesired sideband so as to generate a single sideband signal.

4. The subject matter set forth in claim 1 wherein the means for driving the diode with an information signal is a transmission line connected to an input-output arm of a circulator.

5. The circuitry defined in claim 1 wherein the means for biasing the diode with a modulation signal comprises a signal lead connected to a terminal of the diode, a second terminal of the diode being connected to ground.

6. The subject matter set forth in claim 4 wherein the circulator is also provided with a normal input arm for allowing entry of the information signal to the circulamodulation signal from the diode is characterized as an output arm of the circulator.

8. The circuitry defined in claim 3 wherein the means for driving the diode with an information signal comprises a transmission line connected to an input-output arm of a circulator, the means for biasing the diode with a modulation signal being a signal lead connected to a terminal of the diode, a second terminal of the diode being connected to ground, the circulator being also provided with a normal input arm for allowing entry of the information signal to the circulator, the means connected to the diode for extracting a single sideband modulation signal from the diode being characterized as an output arm of the circulator.

* * * * *